United States Patent [19]

Kwiecinski

[11] Patent Number: 4,554,322

[45] Date of Patent: Nov. 19, 1985

[54] ROOM TEMPERATURE CURABLE POLYBUTADIENE RESINS WITH COPPER ETHYLACETOACETATE CATALYST

[75] Inventor: James R. Kwiecinski, Wilkins Township, Allegheny County, Pa.

[73] Assignee: Westinghouse Electric Corp., Pittsburgh, Pa.

[21] Appl. No.: 591,358

[22] Filed: Mar. 20, 1984

[51] Int. Cl.$^4$ .................. C08F 279/02; C08F 4/10
[52] U.S. Cl. ................... 525/245; 525/259; 525/289; 525/290; 525/304; 525/305
[58] Field of Search ................... 525/245, 290

[56] References Cited

U.S. PATENT DOCUMENTS

| | | | |
|---|---|---|---|
| 3,642,750 | 2/1972 | Wegemund et al. | 525/290 |
| 4,138,390 | 2/1979 | Emmons et al. | 525/245 |
| 4,362,848 | 12/1982 | Friedli et al. | 525/290 |
| 4,442,138 | 4/1984 | Bich et al. | 427/116 |

FOREIGN PATENT DOCUMENTS 57-100168  6/1982  Japan ................... 525/290

Primary Examiner—Wilbert J. Briggs, Sr.
Attorney, Agent, or Firm—R. D. Fuerle

[57] ABSTRACT

Disclosed is a polybutadiene containing resin system which is curable at room temperature by the addition of copper ethylacetoacetate. The resin system consists of about 5 to about 25% polybutadiene, about 55 to about 90% dicyclopentadiene acrylate, about 5 to about 20% of a monomer having 2 to 4 unsaturated groups selected from vinylic, acrylic, and mixtures thereof, about 0.25 to about 3% free radical initiator, and about 0.1 to about 0.8% of a coaccelerator. Also disclosed is a method of curing a resin system and various products made therewith.

14 Claims, No Drawings

ROOM TEMPERATURE CURABLE POLYBUTADIENE RESINS WITH COPPER ETHYLACETOACETATE CATALYST

BACKGROUND OF THE INVENTION

While resins containing polybutadiene are widely used as adhesives, casting resins, and even laminating resins, until now polybutadiene containing resins had to be thermally cured, typically at about 135° to 155° C. Heating the resin during cure, followed by the subsequent cooling, would induce mechanical stresses into the resin which would weaken it. Also, the resin would expand and contract on heating and cooling which would result in a loss of dimensional and structural stability.

SUMMARY OF THE INVENTION

I have discovered a method of making a polybutadiene containing resin which cures at room temperature when a particular catalyst is added. I am able to produce an article which contains polybutadiene resin but without the usual mechanical stresses and loss of dimensional and structural stability found in most products containing polybutadiene.

RELEVANT ART

U.S. patent application Ser. No. 350,907 filed Feb. 22, 1982, now U.S. Pat. No. 4,442,138 titled "Substrate Pretreatment With A Metal-Beta Keto Ester Complex In The Method of Curing An Anaerobic Resin" discloses the use of copper ethylacetoacetate to catalyze the cure of an anaerobic resin which primarily contains acrylic acid.

DESCRIPTION OF THE INVENTION

The polybutadiene containing resin system of this invention is a blend of polybutadiene, dicyclopentadiene acrylate, a polyfunctional monomer, a free radical initiator, and one or more coaccelerators.

The polybutadiene is about 5 to about 25% (all percentages herein are by weight based on total blend weight) of the blend as the blend loses toughness and becomes too brittle if less is used and more polybutadiene is not soluble in the blend. Either 1,4-polybutadiene or 1,2-polybutadiene may be used, but 1,2-polybutadiene is preferred because it has been found to work better.

About 55 to about 90% of the blend is dicyclopentadiene acrylate as if less is used the polybutadiene may not be soluble and if more is used the blend may lose toughness; the preferred amount of dicyclopentadiene acrylate is about 60 to about 85%. No compounds other than dicyclopentadiene acrylate have been found to work as well; styrene and vinyl toluene were tried and found to be sluggish.

About 5 to about 20% of the blend is the polyfunctional monomer. If less polyfunctional monomer is used the heat distortion temperature may be lower and the glass transition temperature of the product may be too low, and if more polyfunctional monomer is used the solubility of the butadiene in the blend may be reduced. The polyfunctional monomer is a compound having two, three, or four vinylic groups, acrylic groups, or mixtures of vinylic and acrylic groups. Polyfunctional acrylates are preferred as they give a higher heat distortion temperature. Difunctional acrylates are preferred for greater flexibility, and pentaerythritol tetra acrylate (PETA) is preferred as it gives a very high heat distortion temperature. Other suitable monomers include hexanediol diacrylate, neopentyl glycol diacrylate, triethylene glycol diacrylate, divinyl benzene, divinyl toluene, and divinyl diethylene glycol.

The amount of free radical initiator in the blend should be about 0.25 to about 3% as if less is used the blend may not cure completely and more is unnecessary. The preferred amount of free radical initiator is about 0.5 to about 1%. While any suitable free radical initiator may be used, hydroperoxides are preferred as they have been found to work well. Cumene hydroperoxide is especially preferred. Other suitable free radical initiators include 2,2-azobis(2-methylpropionitrile), t-butyl hydroperoxide, and t-butyl peroxide.

The amount of coaccelerator in the blend is about 0.1 to about 0.8%. Preferably, however, the blend is a mixture of two coaccelerators, each of which is about 0.05 to about 0.4%. If less coaccelerator is used the blend will not cure well and more is unnecessary. One of the coaccelerators is preferably a tertiary amine or an amide, although amines are preferred as amides may cause instability in the resin system. The amine may be either aliphatic, aromatic, or both. Examples of suitable amines and amides include dimethylformamide, t-butyl amine, triphenyl amine, dipropyl amine, and N,N'-dimethyl-p-nitroaniline. The other coaccelerator is preferably an organic sulfur compound such as trialkyl thioureas, 2-mercaptobenzothiazole, benzimidazole, sodium thiosulfate, and p-toluenesulfonic acid. The preferred coaccelerators are N,N-dimethyl para toluidine and orthobenzoic sulfimide in amounts of about 0.1 to about 0.3% and about 0.05 to about 0.15%, respectively, as the resin system is stable and sufficiently reactive when they are used together. They are typically used in a weight ratio of about 2 to 1.

The blend is cured by contact with copper ethylacetoacetate (CEA). Since the CEA is extremely active it need be used at only about 0.01 to about 0.3%. If less is used the blend may not cure and if more is used the molecular weight of the cured resin may not be very high. A preferred range is about 0.01 to about 0.1%. Since the CEA is a solid, intimate contact can be accomplished by adding it to the resin system as a very finely divided solid, or the CEA can first be dissolved in a solvent then applied to a substrate and allowed to air dry, precatalyzing the substrate with CEA. Suitable solvents include methyl ethyl ketone, toluene, and acetone. If the CEA is dissolved in a solvent, sufficient solvent should be used to dissolve the CEA, which is typically about a 1 to about a 2% solution.

The blend is nonaqueous and does not require a photosensitizer or the exclusion of oxygen in order to cure. Once the CEA is added it will cure rapidly in a few minutes. If desired, a short thermal post cure at about 100° C. for 15 to 30 minutes may be used to increase the glass transition temperature from about 60° to 90° up to about 130° C.

An adhesive can be prepared from the blend by spreading it on a precatalyzed surface, contacting it with the CEA, and pressing a second surface on top of the first surface. A laminate can be prepared by passing a sheet of support material, to precatalyze it, through a solution of the CEA, evaporating the solvent in the solution, forming a stack of the sheets of support material, coating or impregnating the stack of sheets with the blend, then pressing the sheets in the stack together. If the blend is used as a casting resin it is poured into the mold and the CEA, either as a finely divided solid or in solution, is placed on top of the blend.

The following examples further illustrate this invention.

EXAMPLE 1

Six compositions were prepared using various amounts of dicyclopentadiene acrylate (DCPDA), polybutadiene 70% 1,2 unsaturation having a molecular weight of 1800 to 2200 sold by Colorado Chemical Specialties, Inc. under the trade designation "Ricon 150," an acrylate, cumene hydroperoxide (CHP), N,N-dimethyl para toludine (NNDMPT), and orthobenzoic sulfimide (BS). The acrylates used were neopentyl glycol diacrylate (NPGDA), triethlene glycol diacrylate (TEGDA), pentaerythritol tetra acrylate (PETA), and hexanediol diacrylate (HDDA).

A 1% solution of copper (II) ethylacetoacetate was formed in methyl ethyl ketone. Sheets of 3×3 inch 181 glass cloth were dipped into this solution and allowed to air dry. This precatalyzed the glass cloth with the copper ethylacetoacetate at about 1 milligram per square inch. Then, 6 to 8 sheets of the precatalyzed glass cloth were stacked and saturated with various resin compositions. The stacks were put between the plates of a press for 1 to 16 hours at room temperature and 10 to 1000 psi. The following table gives the composition of the blends tested (in grams):

| Sample No. | DCPDA | "Ricon 150" | Acrylate | CHP | NNDMPT | BS |
|---|---|---|---|---|---|---|
| 1 | 75 | 5 | 20 NPGDA | 0.75 | 0.2 | 0.1 |
| 2 | 75 | 5 | 20 TEGDA | 0.75 | 0.2 | 0.1 |
| 3 | 85 | 10 | 5 PETA | 0.75 | 0.2 | 0.1 |
| 4 | 80 | 10 | 10 PETA | 0.75 | 0.2 | 0.1 |
| 5 | 70 | 20 | 10 HDDA | 0.75 | 0.2 | 0.1 |
| 6 | 60 | 25 | 15 HDDA | 0.75 | 0.2 | 0.1 |

EXAMPLE 2

The bottom of a two inch diameter aluminum dish was precatalyzed by allowing a 1% solution of copper ethylacetoacetate in methyl ethyl ketone to evaporate in the dish, which deposited about 3 to 10 milligrams on the bottom of the dish. Four grams of all the resin samples numbers from EXAMPLE 1 were placed in these dishes. The samples gelled within minutes at room temperature to a hard brittle state.

I claim:

1. A two-part polybutadiene containing resin system curable at room temperature in air comprising:
   I. copper ethylacetoacetate; and
   II. a blend which comprises
   (A) about 5 to about 25% polybutadiene that is soluble in said blend;
   (B) about 55 to about 90% dicyclopentadiene acrylate;
   (C) about 5 to about 20% of a polyfunctional monomer having 2 to 4 unsaturated groups selected from vinylic, acrylic, and mixtures thereof;
   (D) about 0.25 to about 3% free radical initiator; and
   (E) about 0.1 to about 0.8% of a coaccelerator.

2. A resin system according to claim 1 wherein said polybutadiene is 1,2-polybutadiene.

3. A resin system according to claim 1 wherein the amount of said dicyclopentadiene acrylate is about 60 to about 85%.

4. A resin system according to claim 1 wherein said monomer is a polyfunctional acrylate.

5. A resin system according to claim 4 wherein said polyfunctional acrylate is pentaerythritol tetra acrylate.

6. A resin system according to claim 1 wherein the amount of said free radical initiator is about 0.5 to about 1.

7. A resin system according to claim 1 wherein said free radical initiator is a hydroperoxide.

8. A resin system according to claim 7 wherein said hydroperoxide is cumene hydroperoxide.

9. A resin system according to claim 1 wherein said coaccelerator is a mixture of about 0.05 to about 0.4% of a compound selected from the group consisting of tertiary amines, amides, and mixtures thereof, and about 0.05 to about 0.4% of an organic sulfur compound.

10. A resin system according to claim 1 wherein said coaccelerator is a mixture of about 0.1 to about 0.3% of N,N-dimethyl para toluidine and about 0.05 to about 0.15% o-benzoic sulfimide.

11. A resin system according to claim 1 wherein said copper ethylacetoacetate has been mixed with said blend.

12. A resin system according to claim 1 wherein said copper ethylacetoacetate is in about a 1 to about a 2% solution of an organic solvent.

13. A two part resin system that cures at room temperature in air when the two parts are combined, comprising:
   I. a blend part which comprises
   (A) about 5 to about 25% 1,2-unsaturated polybutadiene that is soluble in said blend;
   (B) about 55 to about 90% dicyclopentadiene acrylate;
   (C) about 5 to about 20% of a polyfunctional acrylate having 2 to 4 unsaturated groups;
   (D) about 0.25 to about 3% of a hydroperoxide; and
   (E) about 0.1 to about 0.8% of a coaccelerator which comprises a mixture of about 0.05 to about 0.4% of a compound selected from the group consisting of tertiary amines, amides, and mixtures thereof, and about 0.05 to about 0.4% of an organic sulfur compound; and
   II. a catalyst part of about 0.01 to about 0.3% copper ethylacetoacetate.

14. A resin system according to claim 13 wherein said coaccelerator is a mixture of N,N-dimethyl para toluidine and o-benzoic sulfimide.

* * * * *